Figure 1:
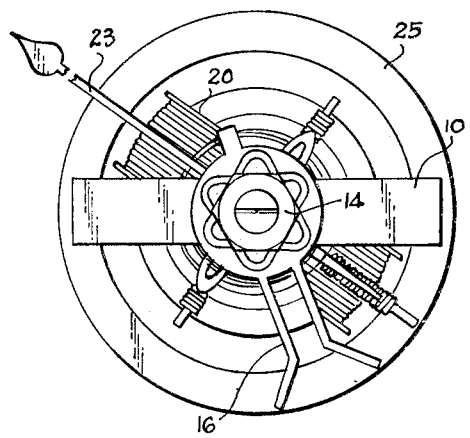

April 4, 1961 A. H. ARBEITER ET AL 2,978,640
D'ARSONVAL-MOVEMENT ASSEMBLY

Filed July 30, 1958 2 Sheets-Sheet 1

INVENTORS
Alvin H. Arbeiter
BY Edward J. Mateja

Ooms, McDougall, Williams & Hersh
Attorneys

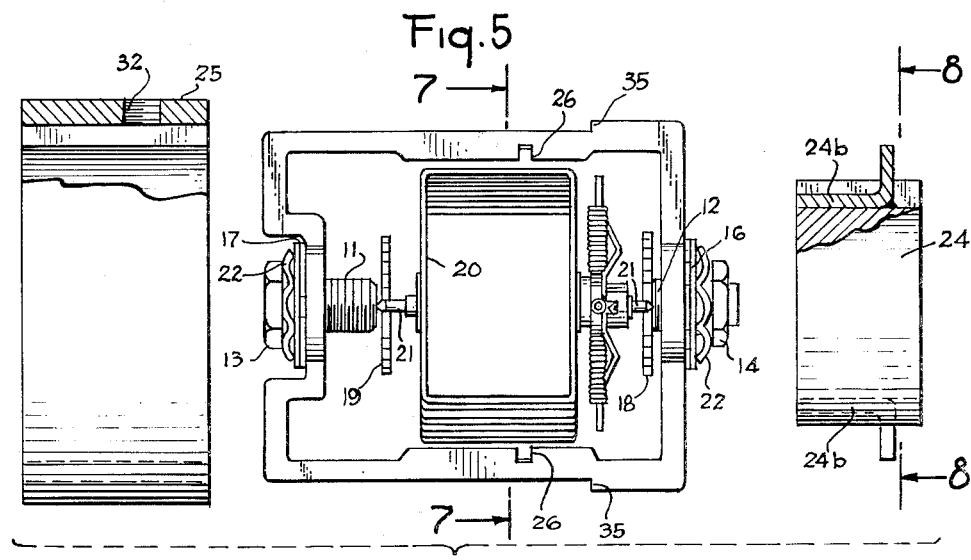
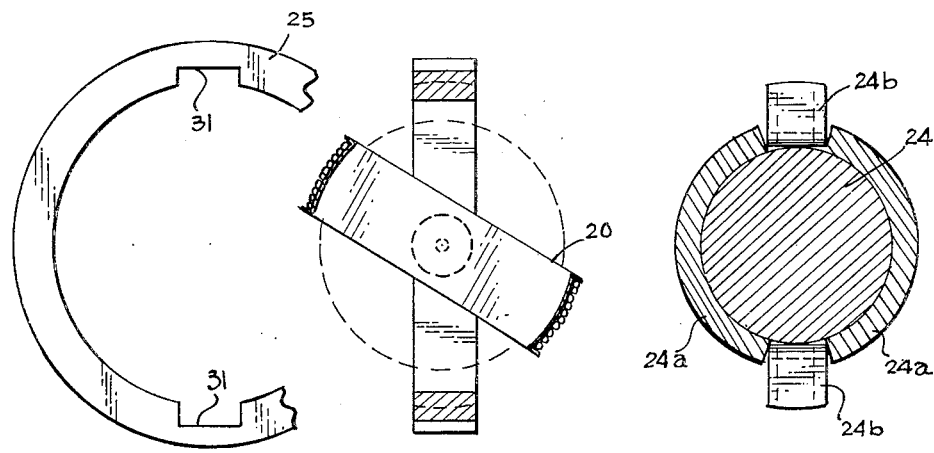

United States Patent Office 2,978,640
Patented Apr. 4, 1961

2,978,640

D'ARSONVAL-MOVEMENT ASSEMBLY

Alvin H. Arbeiter, Berkeley, and Edward J. Mateja, Berwyn, Ill., assignors to American Gage & Machine Company, Chicago, Ill., a corporation of Illinois Filed July 30, 1958, Ser. No. 752,015

4 Claims. (Cl. 324—151)

This invention relates to the field of D'Arsonval movements, and is particularly directed to an improved construction for such movements characterized by important new advantages from the standpoint of assembly, adjustment, and repair.

A D'Arsonval movement in the broad sense consists of a coil of wire mounted for rotational movement in a magnetic field. Such movements are universally used today in delicate current-responsive instruments of many kinds, particularly including sensitive meters and sensitive relays. A D'Arsonval movement is customarily so constructed that the coil is held in a normal angular position by delicate springs. Rotation of the coil away from the normal position occurs when a direct current is passed through it, the magnitude of rotation being proportional to the strength of the current within predetermined limits. When such an instrument is used as a meter, a light needle is customarily mounted for rotation with the coil, the magnitude of current passing through the coil being indicated by the relative position of the needle and a fixed scale. Sometimes the scale is mounted for rotation with the moving coil and is read against a fixed indicating needle.

When a D'Arsonval instrument is used as a sensitive relay, one or more contact arms are mounted for rotation with and by the coil, in lieu of, or in addition to, the indicating needle.

While the D'Arsonval movement as such has been known to the art for many years, extraordinary advances in the design of such instruments have taken place in the last decade or two, with resulting improvement in sensitivity. Thus, as recently as twenty-five years ago, a D'Arsonval movement providing full-scale deflection with a current of ten milliamperes was typical, and an instrument yielding full-scale deflection on a current of one milliampere was regarded as a very sensitive movement. By contrast, D'Arsonval movements yielding full-scale deflection on a current of 50 microamperes are commonplace today, and ten-microampere movements are commercially obtainable at surprisingly modest prices.

This progressive increase in sensitivity has of course been accompanied by ever-increasing structural delicacy. The amount of torque available from the current of a few microamperes is very small, even when a strong magnetic field and a coil of many turns are employed. Hence the moving parts of an instrument intended to function on such low currents must have extremely low mass, must be mounted in jeweled bearings of very low friction coefficient, and must be balanced by hair springs of extraordinary delicacy.

Another line of advance in the art which has contributed to the increasing delicacy of D'Arsonval movements has been the trend toward miniaturization. D'Arsonval instruments today are often much smaller in size than those of past years.

The extreme delicacy of the moving parts in modern D'Arsonval instruments has made commercial production an increasingly touchy problem—particularly the physical assembly of the parts. The major object of the present invention is to provide a novel D'Arsonval-movement construction in which the mechanical assembly is greatly simplified.

To provide the strong magnetic field necessary for operation of a sensitive D'Arsonval movement, a magnetic circuit is provided in which the air gap is a narrow annular space. The magnetic circuit consists of a ring-shaped element surrounding the moving coil and a cylindrical element mounted inside the coil, the coil itself being pivotally mounted for rotation in the annular air gap defined by the coaxially disposed cylindrical element and ring element. Either the inner cylindrical element or the outer ring element is permanently magnetized, the other element being made of soft iron or like material.

In prior-art D'Arsonval movements, the moving coil, or armature as it is sometimes called, has had to be fitted loosely over the inner core piece, and the core piece has then been rigidly secured in position relative to the non-magnetic frame of the instrument. Thereupon, with the inner magnetic element already fixed in position within the armature, the delicate steps of mounting the armature in its jeweled bearings and mounting and adjusting the balancing springs have been performed. (The balancing springs, in addition to determining the zero-current position of the armature, also serve the function of conducting current into and away from the armature.)

The delicate tasks of mounting the armature and the springs have been made considerably more difficult by the presence of the inner core piece. Moreover, the fact that the inner core piece had to be anchored to the frame before the armature assembly was completed has meant that any defect in the inner core piece required complete disassembly of the instrument to permit its replacement. This procedure has been time-consuming and expensive and has been accompanied by considerable risk of injury to the delicate armature assembly.

The present invention provides a D'Arsonval-movement construction in which the armature can be mounted in its bearings and the balancing springs can be mounted and adjusted prior to insertion of the inner core member into position on the frame of the instrument. Similarly, with the present invention, the inner core can be removed at will for repair or replacement without any disturbance of the armature assembly. Achievement of these desirable features constitute other important objects of the invention.

Another feature and important object of the present invention is the provision of a D'Arsonval-movement assembly in which, if desired, the angular position of the inner core piece relative to the outer core piece and the armature assembly can be adjusted within narrow limits after the movement has been completely assembled, without any disturbance of the armature assembly. In some applications, this feature is of great importance, particularly during factory testing and final adjustment, since it permits a simple mechanical adjustment to compensate for small variations in the magnetic properties of the inner core pieces encountered in a production run.

Other objects and advantages of the invention will appear from the following detailed description of a typical embodiment thereof.

Figure 2:
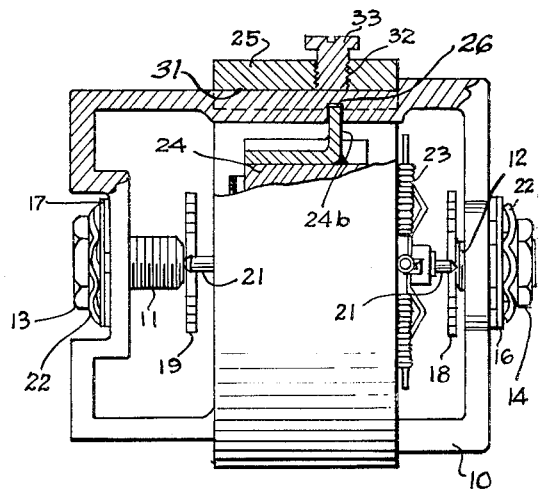
Figure 3:
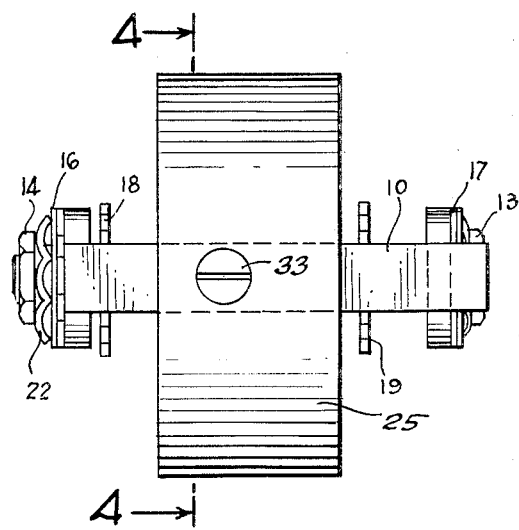
Figure 4:
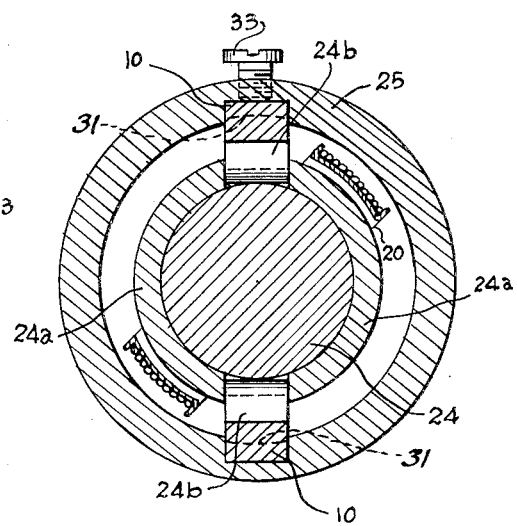

In the appended drawing, Figure 1 shows a front elevation view of a typical D'Arsonval movement embodying the present invention. Fig. 2 is a side view of the Fig. 1 instrument, partly in section, bringing out some of the more important structural details thereof. Fig. 3 is a plan view of the Fig. 1 instrument. Fig. 4 is a sectional view through the Fig. 1 instrument, taken along the line 4—4 of Fig. 3. Fig. 5 is an exploded view of the instrument of Fig. 1, showing separately the frame carrying the armature assembly, the inner core piece and the ring-shaped outer yoke. Fig. 6 is a fragmentary elevation view of the ring-shaped yoke which forms the outer part of the magnetic circuit in the Fig. 1 instrument. Fig. 7 is a sectional view through the armature assembly along the line 7—7 of Fig. 5. Fig. 8 is a sectional view through the inner core member, along the line 8—8 of Fig. 5.

The D'Arsonval movement illustrated in the drawing is mounted on a generally rectangular hollow frame member 10 made of a relatively rigid non-magnetic material such as aluminum. The frame member 10 is drilled and threaded in the mid-portions of its front and rear sides to receive screws 11 and 12, and lock nuts 13 and 14 are provided to secure the screws against further movement after factory adjustment. The screws 11 and 12 are recessed on their inner ends to receive jewel bearings (not shown). Secured between the lock nuts 13 and 14 and the frame are a pair of bracket arms 16 and 17 which provide respectively the outer seats or anchors for the balancing springs 18 and 19. These are delicate coil springs, the inner ends of which are secured to the armature 20 near its axis. The armature 20 consists of a coil of very fine wire which may be self-supporting or wound on a thin form of suitable non-magnetic material, and it is provided along its axis of rotation with a pair of bearing shafts 21 having pointed ends that ride within the jeweled bearings already mentioned.

Lock washers 22 are carried on the screws 11 and 12 immediately under the lock nuts 13 and 14. An indicating needle 23 is in the illustrated embodiment rigidly mounted on one end of the shafts 21.

The structure just described which collectively comprises the armature assembly, including the armature proper, indicating needle, the shafts, the bearings, the balancing springs, and their supports are conventional elements of modern D'Arsonval instruments and have been briefly described for the sake of clarity, even though they do not per se constitute the novel subject matter of the present invention. It should be understood that our invention is adaptable to any type of armature assembly. Because the parts just described are conventional in modern D'Arsonval instruments, we have not described them in great detail, simply because anyone skilled in the D'Arsonval-movement art will be familiar with such structures.

The core 24 which forms the inner portion of the magnetic circuit in our invention is shown clearly in Figs. 5 and 8, and the outer ring-shaped element 25 forming the remainder of the magnetic circuit of our instrument is most clearly shown in Figs. 5 and 6. As will be understood by persons skilled in the art, one or the other of these elements will be permanently magnetized, while the other will be made of soft iron. For purposes of the present description, we shall assume that the inner member 24 is the permanent magnet, and the ring member 25 is made of soft iron or like material. It should be understood, however, that this is a matter of choice.

The inner core member 24 may be made principally of one of the alloys currently available and generally used in permanent magnets, such as Alnico 6. Overlying the alloy core of element 24 are a pair of soft iron pole pieces 24a cemented or otherwise secured to the inner core, each of the pole pieces 24a extending over somewhat less than half the circumference of the cylindrical core member, as shown in Figs. 4 and 8. The pole pieces 24a are symmetrically disposed on the alloy core of element 24, leaving two oppositely disposed zones on the core which are occupied by bracket members 24b, made of brass or other rigid non-magnetic material. Each of the bracket members 24b consists of a foot portion bearing against and soldered to the alloy core and an outwardly extending ear portion which projects radially beyond the peripheral surface defined by the pole pieces 24a. (To facilitate soldering, the outer surface of the alloy core of element 24 may be plated with a thin layer of copper.)

In the embodiment shown, the inner magnetic element 24 is permanently magnetized along an axis perpendicular to the cylindrical axis of the core and also perpendicular to the line defined by the midlines of the brackets 24b. This results in the pole pieces 24a being permanently magnetized in opposite polarity.

The inner faces of the top and bottom legs of frame member 10 are provided with a pair of transverse rectangular notches 26, positioned to receive the projecting ears of bracket members 24b when the core member 24 is correctly positioned within the armature 20.

For reasons which will presently be described in detail, the depth of the notches 26 is so chosen as to provide, from the bottom of one notch 26 to the bottom of the other, a distance slightly greater, by a few thousandths of an inch, than the total span between the extremities of the projecting ears 24b. The width of the notches 26 may be substantially equal to the width of the projecting ears 24b, with a small clearance added to permit the ears to slide readily within the notches.

The ring-shaped yoke member 25 is proportioned to have an inner diameter sufficiently greater than the outer diameter of armature 20 to permit the armature to turn readily therewithin when mounted coaxially of yoke 25. Diametrically opposed on the inner face of yoke member 25 are a pair of rectangular notches 31 or slots formed to receive slidably the top and bottom legs respectively of frame member 10. This is shown clearly in Figs. 4 and 6.

A radial aperture 32 is drilled through yoke 25 along the midline of one of the notches 31 and is threaded to receive a locking screw 33.

In the instrument as described thus far in this specification, it may be assumed that the width of the projecting ears of bracket members 24b is substantially equal to the width of the top and bottom legs of frame 10. This is as shown in Fig. 4. If desired, however, the projecting ears of brackets 24b may be made substantially narrower than the legs of frame 10, as indicated by dotted lines in Fig. 8. This structural modification permits flexibility of angular adjustment of the core 24 relative to the other parts of the assembly, as will presently be described in greater detail.

In the assembly of a D'Arsonval movement embodying our invention, all the mechanically delicate parts can be permanently mounted in position prior to introduction of either the inner magnetic core member 24 or the outer magnetic-field member 25. When the armature, balancing springs, indicating needle, and bearings have all been assembled and properly adjusted, the inner core member 24 may then be inserted in position. This is done by slipping the core member 24 into the interior of the armature 20 in such an angular position that the ears 24b do not touch the armature. The core member 24 is then rotated by the assembler until the projecting ears 24b enter and seat within the notches 26. As may be readily understood from an examination of Fig. 4, this step can be performed without interfering in any way with the armature 20. Sufficient clearance is provided between the bottoms of the notches 26 and the leading edges of the ears 24b to permit rotation of the ears within the notches.

When the inner magnetic core element 24 has thus been seated in proper position inside the armature 20, with the ears 24b occupying the notches 26, the outer magnetic element 25 is then slid over the upper and lower legs of frame 10, the legs sliding within the notches 31 in yoke 25. The radial aperture 32 in yoke 25 is so positioned that it lies directly over one of the notches 26 when the yoke 25 has been properly positioned on the frame 10. To insure such proper positioning, the frame 10 may be provided with a pair of rectangular shoulders 35, as shown in Fig. 5, serving as stops to limit the forward sliding motion of the yoke 25 on the frame 10.

At this point, when the yoke 25 is properly positioned on the frame 10, the locking screw 33 is tightened. This compresses by a few thousandths of an inch the upper and lower legs of frame 10 and securely locks the inner core member 24 against movement. Core 24 may also be secured against rotational movement by proportioning the length of the ears 24b and the depth of the notches 26 so as to extend the ears 24b slightly into the notches 31 of yoke 25. By this design, as shown in the drawing, the yoke 25 cannot be slid into its fully advanced position unless the ears 24b are wholly received within the notches 26. When the width of the ears 24b is made equal to the width of the top and bottom legs of frame 10, as indicated in solid lines in Fig. 8, the core 24 is clamped against all movement once the set screw 33 has been tightened.

If a limited amount of angular adjustability is desired for core 24, then the ears 24b may be made narrower than the legs of the frame 10 as heretofore described and as shown in dotted lines in Fig. 8. Under these circumstances, the side walls of notches 31 on the yoke 25 prevent the core 24 from being moved outside of the slots 26, but a limited amount of freedom of rotation is afforded for the ears 24b within the notches 26 prior to tightening of the set screw 33. When this feature of the invention is employed, small angular positioning of the core 24 is possible merely by the loosening of screw 33, and, when the screw is re-tightened, the core 24 is again securely held in its new position.

From the preceding detailed description, readers skilled in the art will note that our invention, in addition to having important advantages in original assembly, possesses great superiority over prior-art instruments with respect to repair and sub-assembly adjustment. Thus, for example, if the magnetic characteristics of the core 24 should prove to be sub-standard on final factory test, the core 24 can be removed and replaced with a substitute without any disassembly of the delicate moving parts comprising the armature, springs, and bearings. This is an important feature, because magnetic core elements cannot be perfectly standardized in production, and not all sub-standard core elements can be detected and eliminated prior to final instrument assembly. With prior-art constructions, replacement of the inner core member has required complete disassembly of the instrument and subsequent reassembly. The present invention not only provides much lower labor expense in repair and replacement of parts but also reduces the risk of danger to the delicate moving parts of the instrument necessarily incurred when the instrument is disassembled and reassembled.

It should be understood, and may be noted from the drawing, that the outer edges of the ears 24b and the corresponding bottom surfaces of the notches 26 may be slightly curved to facilitate rotational movement of the ears within the notches.

While we have in this specification described in considerable detail a typical embodiment of our invention, it should be understood that such embodiment is merely illustrative, and many departures and variations from the structure shown may be made within the spirit of the invention. It is accordingly our desire that the scope of the invention be measured primarily by reference to the appended claims.

We claim:

1. In a D'Arsonval movement, a magnetic-field assembly comprising a frame having a pair of spaced legs, each of said legs being provided on its side facing said other leg with a notch extending wholly thereacross, an inner core member comprising a main portion formed at least principally of magnetically permeable material and having a pair of oppositely disposed projections shaped and dimensioned to be received within said notches, the spacing between said notches and the extent of said projections being proportioned to permit said projections to enter said notches by rotational movement of said inner core member, and an outer yoke member made at least principally of magnetically permeable material and dimensioned to slide over and surround said legs, the inner surface of said yoke member containing at least one slot adapted to receive and partially overlie one of said leg members, said yoke member being provided with manually adjustable means tightenable against one of said legs for compressing the same and locking said projections within said notches to hold said inner core member fixed in position when said projections have been received within said notches, the depth of said slot being sufficient to cause the side walls thereof to overlie at least partially the ends of the notch in the leg received within said slot when said yoke is moved over said legs to the position directly surrounding said inner core member, thereby limiting rotational movement of said inner core member, one of said yoke and core members being permanently magnetized.

2. The apparatus defined in claim 1 wherein said legs are provided with stop means preventing advancement of said yoke thereon beyond the position whereat said yoke overlies and surrounds said inner core member.

3. Apparatus according to claim 1 wherein said projections carried by said inner core member are narrower than said frame legs, whereby said core can be rotated within narrow limits while said projections are within said notches prior to tightening of said adjustable means.

4. In a D'Arsonval movement, a frame of generally rectangular conformation defining a pair of spaced legs and having a pair of bearing-supporting members joining said spaced legs at opposite ends of said frame, low-friction bearings carried by said respective support members, an assembly comprising a moving coil pivotally supported between said bearings for rotation within said frame, an inner core member formed at least principally of magnetically permeable material shaped and dimensioned to fit within said coil and to afford a limited clearance therefrom, said inner core member being also shaped and dimensioned to be received snugly between the facing sides of said legs, the facing sides of said legs and the portions of said inner core member adapted to bear thereagainst being mutually modified to define interlocking means for said legs and said core member, said interlocking means being formed to permit said core member to be moved into and out of position between said legs by rotational movement of said inner core member, a ring-shaped outer yoke member made at least principally of magnetically permeable material and formed to fit snugly around said legs, and manually releasable means associated with said outer yoke member for applying inward compressive force to said spaced legs operative to tighten the same against said core member and to cause said interlocking means to hold said core member in a predetermined position within said coil, said inner core member being removable from said coil assembly and said frame when said force-applying means is released, without disturbance of said bearings or armature assembly, by angular rotation of said core member relative to said frame and subsequent lateral translation of said core member, one of said magnetically permeable members being permanently magnetized to provide a magnetic field in the space occupied by said moving coil.

References Cited in the file of this patent

UNITED STATES PATENTS

| | | |
|---|---|---|
| 1,022,795 | McClair | Apr. 9, 1912 |
| 2,416,835 | Lingel | Mar. 4, 1947 |
| 2,607,812 | Lederer | Aug. 19, 1952 |
| 2,826,740 | Bernreuter | Mar. 11, 1958 |
| 2,834,942 | Eggers | May 13, 1958 |